United States Patent
Koyasu et al.

[11] 3,901,220
[45] Aug. 26, 1975

[54] ENDOSCOPES
[75] Inventors: Takeo Koyasu, Sagamihara; Mituhiro Tokuhara, Yokohama, both of Japan
[73] Assignee: Canon Kabushiki Kaisha, Tokyo, Japan
[22] Filed: June 29, 1973
[21] Appl. No.: 375,071

[30] Foreign Application Priority Data
July 24, 1972 Japan................................ 47-73946

[52] U.S. Cl..................................... 128/6; 350/168
[51] Int. Cl.² ............................................ A61B 1/06
[58] Field of Search............ 128/4, 6, 7, 8; 350/168

[56] References Cited
UNITED STATES PATENTS
| | | | |
|---|---|---|---|
| 3,191,487 | 6/1965 | Kruythoff et al. | 350/168 |
| 3,390,257 | 6/1968 | Lohmann | 350/168 X |
| 3,449,037 | 6/1969 | Koester | 350/168 X |
| 3,471,214 | 10/1969 | Polanyi | 350/168 X |
| 3,534,729 | 10/1970 | Sakamoto | 128/6 |

*Primary Examiner*—Richard A. Gaudet
*Assistant Examiner*—Henry S. Layton
*Attorney, Agent, or Firm*—Toren, McGeady and Stanger

[57] ABSTRACT

An endoscope provided with a color-dispersion prism or diffraction grating incorporated in front of the distal end of a fiberscope bundle within the endoscope protective sheath to perform functions of changing the optical axis for incident light issuing from an object to be examined and simultaneously of color-dispersion of said light, while an image-forming light focused on the distal end of the fiberscope bundle and emerging from the proximal end of the fiberscope bundle is allowed to pass through a color-redintegration optical system, thereby to provide an image of improved quality.

11 Claims, 9 Drawing Figures

ENDOSCOPES

This invention relates to an optical system of an endoscope, and more particularly it relates to an optical system in which accommodation is made for improvement of image quality in the image transmission through a fiberscope.

Endoscopes of the conventional type provided with a fiberscope bundle (a flexible fiber bundle of viewing an image) to transmit an object image, a typical example of which is a gastrofiberscope, have found their wide uses in the medical examination of internal organs and cavities of a living body and the observation of curved interiors of industrial articles. However, several basic problems with regard to their constructional features have been encountered in that the gaps among the fiber elements of the fiberscope bundle are superimposed over an image of an object to be examined, thereby half-tone dots appear on the image to deteriorate the image quality, and in that dark points due to the breakage of fiber elements appear, and in that the resolving power depends on the diameter of each fiber element.

The present invention has for the object to alleviate the problems and is characterized as have incorporated particularly in an endoscope of the side viewing type as represented by a gastrofiberscope an optical system which changes the optical axis and simultaneously performs a function of improving the quality of image. For achievement of the object, according to the invention, image-forming rays of light before focused on the distal end of a fiber bundle are color-dispersed, and then allowed to impinge thereon, while the color-dispersed rays of light transmitted through the fiber bundle and emerging from the proximal and are color-redintegrated, thereby the half-tone effect due to the fiber bundle structure is eliminated to increase the resolution of the image on the basis of the well-known principle. In the side viewing endoscope of the invention, the principle is effectively utilized in combination with the change of the optical axis.

The present invention will be described by referring to the attached drawings.

Figure 1:
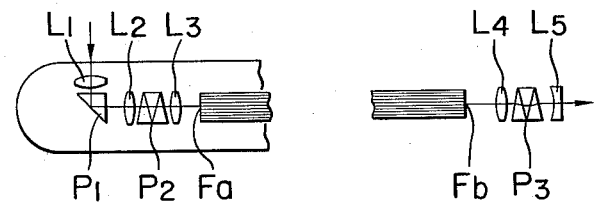
FIG. 1 is a schematic sectional view illustrating the optical system of the invention in the basic form.

An application of such a color-disperson optical system to a front image-forming system section of a conventional endoscope of the side viewing type may be made as illustrated in FIG. 1, wherein $L_1$ designates an objective lens and $P_1$ a prism for changing the optical axis. An image of an object to be examined is focused by lens $L_1$ at a position between prism $P_1$ and lens $L_2$. Next, an image-forming light is refracted by lens $L_2$ into a parallel flux of light, passing in and through and out of a color-disperson prism, and being focused by lens $L_3$ on the distal end $fa$ of a fiberscope bundle. On the surface of the distal end $Fa$, an image of a point detail on an object to be examined is linearly expanded by the color dispersion. In other words, a point image is expanded into a colored line image which is transmitted through a plurality of fiber elements to the proximal end $Fb$ of the fiberscope bundle. Light of rays emerging from $Fb$ is refracted by lens $L_4$ into a parallel flux of light, enters a color-redintegration prism $P_3$ and, after a color redintegration is effected, is allowed to reach eyepiece $L_5$. However, it is of importance particularly in the case of surgical endoscopes to minimize the size of the front part thereof, so that the complexity of the front imageforming system section must be furthermore minimized.

Figure 2:
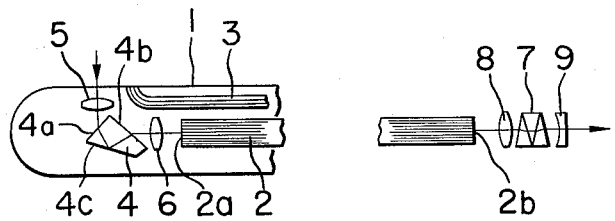
FIG. 2 is a schematic sectional view of one embodiment of the optical system of the invention.
Figure 9:
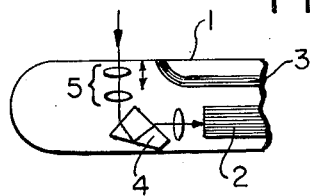

FIG. 2 is a schematic representation of one embodiment of the invention. The reference number 1 is a protective sheath of the front part of an endoscope provided with a fiberscope bundle 2 and an illumination light-carrier 3 for illuminating an object to be examined. A prism 4 having an entrant surface 4a, exit surface 4b and a reflecting surface 4c is arranged so that rays of light passing out of an objective lens 5 undergo refraction and reflection to be directed to the distal end 2a of the fiberscope bundle. In this case, the reflecting surface 4c of prism 4 permits the image to appear laterally inverted. Therefore, it is preferable to cut away the reflecting surface to provide roof type surfaces which permit the image to appear erected. The arrangement of lenses 5 and 6 is such that a flux of light issuing from an object to be examined at a finite distance passes through the prism as a parallel flux of light, and then an image of the object to be examined is focused on the distal end 2a of the fiber scope bundle. Such an arrangement may be modified for requirement of focusing adjustment in accordance with the object distance in such a manner that lens 5 is replaced by a group of lens elements as shown in FIG. 9, part of which is made movable for focusing along the optical axis.

On the other hand, in a rear image-forming system section behind the proximal end 2b of the fiber bundle, there are arranged lenses 8 and 9, and a color-redintegration prism 7 to produce a completely color correct image which is viewed through eyepiece 9. Referring again to the front image-forming system section, the prism 4 is arranged to incline the entrant surface 4a and exit surface 4b through angles with respect to the optical axis so that incident rays of light are dispersed in accordance with refractive indices for their respective wave lengths, thereby as has been mentioned before, an image of a point detail of an object to be examined is focused on the fiber distal end 2a as a linearly expanded image which is then transmitted through a plurality of single fibers to the proximal end 2b of a bundle of the single fibers. In this case, the quantity of dispersion D on the fiber bundle ends depends on a product of the dispersion angle of prism 4 and the focal length of lens 6. Rays of light emerging from the proximal end is collimated by lens 8, passing in and through a prism 7 to undergo again color dispersion. When the product $D'$ of the dispersion angle of prism 7 and the focal length of lens 8 coincides with the quantity of dispersion D effected in the front image-forming system section, their half-tone effect due to the fiber bundle structure is completely eliminated, and the resolution is improved in comparison with that of conventional endoscopic instruments employing the fiber elements having the same diameter.

Figure 3:
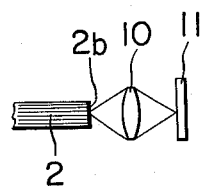
FIG. 3 depicts a direct photography of the image conveyed via a fiber bundle.
Figure 4:
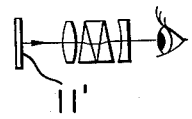
FIG. 4 is a schematic sectional view of an independent optical system for image redintegration.

If, for documentation purposes, the endoscope is to be equipped with, for example, a photographic device, a convex lens may be employed to be arranged behind eyepiece 9. In the alternative, an endoscope constructed without the rear image-forming system section, for example, a color-redintegration optical system as comprising lenses 8 and 9, and a prism 7 shown in FIG. 2 may be equipped with a photographic camera device having a color-redintegrating optical system incorporated therein to obtain a color correct image. Further, an shown in FIG. 3, an image-forming light emerging from the proximal end of the fiberscope bundle is focused on an image medium by an optical system 10 which is usually used for photographic purposes, and then the imaged medium 11' such as a photographic print is viewed through a color redintegration optical system as comprising lenses 8 and 9 and a prism 7.

Figure 5:
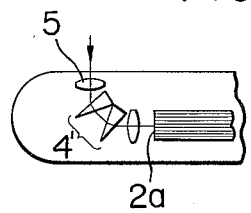
FIGS. 5–9 are schematic sectional views of other embodiments of the invention.
Figure 6:
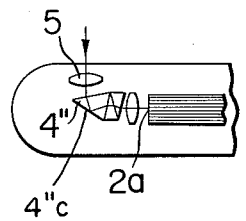
Figure 7:
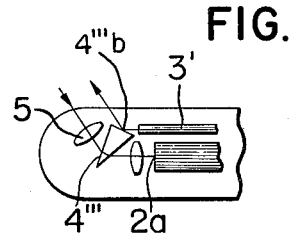

FIG. 5, FIG. 6 and FIG. 7 are schematic views of other embodiments of the optical system section for the color dispersion and the change of the optical axis which are constructed by using prisms of different type but are capable of the same optical performance.

Figure 8:
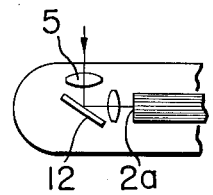

In the embodiment illustrated in FIG. 5, the image is laterally inverted, while in the embodiment illustrated in FIG. 6, the image appears erected when the reflecting surface 4"c is of the roof type. The reference characters 4' and 4" denote prisms. FIG. 7 illustrates a squint case in which the base 4'''b of prism 4''' is silvered so that an illumination light projected from a light-carrier 3 is deflected therefrom through a predetermined angle. FIG. 8 illustrates still a furthermore embodiment in which a reflection grating 12 is employed so that the color dispersion of the reflected light gives an effect identical to that given in the above-mentioned embodiments.

As indicated above, it will be recognized that the optical system of the present invention provides for the possibility of formation of an image of far advanced quality as compared with conventional fiberscopes by virtue of elimination of the fiber half-tone effect, removal of dark points due to the fiber breakage and an increase of resolution, all of which are effected by the employment of a novel technique characterized by the combination of the deviation of incident light path with color dispersion, while still fulfilling the condition required for endoscopes to minimize the size of the front end portion thereof on the basis of the minimized complexity of the structure. Therefore, the endoscopes of the invention may be advantageously used for exploring internal cavities of a living body, thereby the documentation of the medical examination is made under a high definition of small details.

What is claimed is:

1. An endoscope for inspecting an object, comprising a protective sheath, a fiberscope bundle for transmitting an optical image accommodated within said protective sheath, said fiberscope bundle having distal and proximal end surfaces, a first optical system located adjacent the distal end surface of said fiberscope bundle so as to introduce light from the object to be inspected from a direction lateral of said protective sheath toward the front end surface of said fiberscope bundle, said optical system being composed of first optical means effective to bend the optical axis of said incident light beam as well as to cause color-dispersion of said incident light beam and second optical means cooperating with said first optical means to form an image of said incident light beam on the distal end surface of said fiberscope bundle, and a second optical system having a substantially linear optical axis and located adjacent to the proximal end surface of said fiberscope bundle for redintegrating the image emitted from the rear end surface of the fiberscope bundle.

2. An endoscope as described in claim 1, wherein the first optical means includes a color dispersion prism arranged to position one of its surfaces other than the light-striking and light-emerging surfaces adjacent the distal end of a bundle for illuminating an object to be examined so that the object is illuminated by reflection from said surface of the prism.

3. An endoscope as described in claim 1, wherein said first optical means includes two or more prismatic wedges.

4. An endoscope as in claim 1, characterized by employing an optical system comprising a plurality of the adjustable lenses with variable focuses serving as the second optical means.

5. An endoscope as in claim 1, wherein said first optical means include reflection grating.

6. An endoscope as described in claim 1, wherein the first optical means includes a color dispersion prism with at least one totally reflecting surface so that while incident rays of light from the object to be examined are dispersed by said prism, the optical axis for the incident light is simultaneously changed thereby.

7. An endoscope as in claim 6, characterized by employing a roof-shaped pentagonal prism to obtain an erect image of the object and serving as a color-dispersing prism.

8. An endoscope for inspecting an object, comprising a protective sheath, a fiberscope bundle having front and rear end surfaces for transmitting an optical image accommodated within said protective sheath, an optical system located adjacent to the front end surface of said fiberscope bundle to introduce light from an object to be inspected transverse to the longitudinal direction of the bundle at the front end toward the front end surface of said fiberscope bundle, said optical system having first optical means for bending the optical axis of the light from the object transversely and for causing color dispersion and second optical means cooperating with said first optical means, for forming an image of said incident light beam on the front end surface of said fiberscope bundle, a recording medium located adjacent to the rear end surface of said fiberscope bundle for recording an emerging image emitted from the rear end surface of the fiberscope bundle, and image forming optical system for forming an image of the light beam emitted from the rear end surface of said fiberscope bundle on said recording medium.

9. An endoscope as in claim 8, wherein said bundle defines a longitudinal direction and wherein said first optical system includes third optical means within the sheath for directing light from a direction transverse to the longitudinal direction of the bundle toward the first optical means.

10. An endoscope as in claim 9, wherein said first optical means receives the light coming from said third optical means and redirects the light toward the longitudinal direction of the bundle.

11. An endoscope for inspecting an object, comprising a bundle of optical fibers defining a longitudinal direction and having a distal end and a proximal end, a sheath surrounding the bundle, first light transmitting means within the sheath beyond the distal end of the bundle for transmitting light from a direction transverse to the longitudinal direction of the bundle into the sheath from the object, light control means in the path of light through said light transmitting means for bending the light transversely into the longitudinal direction of the bundle and simultaneously causing color dispersion of the light onto the distal end of the bundle, said light control means being located within the sheath beyond the distal end of the bundle, and reconstituting means beyond the proximal end of the bundle for reconstituting the image appearing at the proximal end of the bundle.

* * * * *